United States Patent
Sung et al.

(10) Patent No.: US 9,055,610 B2
(45) Date of Patent: Jun. 9, 2015

(54) INTEGRATED BASE STATION FOR MANAGING MULTIPLE SIMPLIFIED RADIO ACCESS POINTS

(75) Inventors: Dan Keun Sung, Daejeon (KR); Byoung Hoon Jung, Daejeon (KR); Hansung Leem, Daejeon (KR); Hyun Jik Kim, Daejeon (KR); Eunmi Chu, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 366 days.

(21) Appl. No.: 13/564,770

(22) Filed: Aug. 2, 2012

(65) Prior Publication Data

US 2013/0034358 A1 Feb. 7, 2013

(30) Foreign Application Priority Data

Aug. 2, 2011 (KR) ........................ 10-2011-0076877

(51) Int. Cl.
  *H04W 4/00* (2009.01)
  *H04W 88/08* (2009.01)
  *H04W 36/14* (2009.01)
(52) U.S. Cl.
  CPC ............ *H04W 88/085* (2013.01); *H04W 36/14* (2013.01); *Y02B 60/50* (2013.01)
(58) Field of Classification Search
  CPC .......... H04W 88/085; H04W 36/0083; H04W 88/08
  See application file for complete search history.

(56) References Cited

U.S. PATENT DOCUMENTS

| 6,807,374 | B1 * | 10/2004 | Imajo et al. .................... 398/115 |
|---|---|---|---|
| 2007/0123260 | A1 | 5/2007 | Kim et al. |
| 2009/0017823 | A1 | 1/2009 | Sachs et al. |
| 2009/0029645 | A1 * | 1/2009 | Leroudier .......................... 455/7 |
| 2009/0109925 | A1 | 4/2009 | Nakamura et al. |
| 2010/0014494 | A1 * | 1/2010 | Schmidt et al. ................ 370/338 |
| 2010/0150566 | A1 * | 6/2010 | Soto et al. ...................... 398/115 |
| 2011/0002219 | A1 * | 1/2011 | Kim et al. ...................... 370/203 |
| 2011/0032824 | A1 * | 2/2011 | Eyuboglu et al. ............. 370/237 |
| 2011/0053634 | A1 * | 3/2011 | Rofougaran ............... 455/550.1 |
| 2011/0055886 | A1 * | 3/2011 | Bennett et al. ................ 725/116 |
| 2011/0135013 | A1 * | 6/2011 | Wegener ........................ 375/241 |
| 2011/0170510 | A1 * | 7/2011 | Ren .............................. 370/329 |
| 2012/0309349 | A1 * | 12/2012 | Schmidt et al. ................ 455/410 |
| 2013/0286925 | A1 * | 10/2013 | Fischer et al. ................ 370/312 |
| 2014/0198655 | A1 * | 7/2014 | Ishii et al. ..................... 370/235 |

FOREIGN PATENT DOCUMENTS

| JP | 2009-124684 | 6/2009 |
|---|---|---|
| KR | 10-0726184 B1 | 6/2007 |
| KR | 10-0740787 B1 | 7/2007 |

* cited by examiner

*Primary Examiner* — Phirin Sam
(74) *Attorney, Agent, or Firm* — Bacon & Thomas, PLLC

(57) ABSTRACT

There is disclosed an integrated base station (BS) communicatively combined with two or more simplified radio access points (APs). The integrated BS is configured to receive a signal from a backbone/backhaul network and transmits the received signal to the simplified radio APs, route a signal to at least one of the two or more simplified radio APs, and communicate with the two or more simplified radio APs through wireline communication.

16 Claims, 5 Drawing Sheets

INTEGRATED BASE STATION FOR MANAGING MULTIPLE SIMPLIFIED RADIO ACCESS POINTS

CROSS-REFERENCE TO RELATED APPLICATION(S)

The present invention claims priority of Korean Patent Application No. 10-2011-0076877, filed on Aug. 2, 2011, which is incorporated herein by reference.

FIELD OF THE INVENTION

The present invention relates to a base station for radio communication; and more particularly, to an integrated base station for managing two or more simplified radio access points.

BACKGROUND OF THE INVENTION

A radio communication network includes a network for providing a voice call and data communication such as a cellular network and a network for providing data communication such as a wireless local area network (WLAN). The radio communication network includes a radio access point that serves to receive a signal from a backbone/backhaul network, converts the received signal into a radio signal, and transmits the same to a terminal, and reversely, receives a radio signal from a terminal and delivers it to the backbone/backhaul network. In a cellular network, a radio access point is called a base station, and in a WLAN, a radio access point is called an access point. Such a radio access point has a coverage within which a signal may reach depending on signal strength, a communication environment and the like, and provides communication to a user terminal existing within the coverage.

Figure 1:
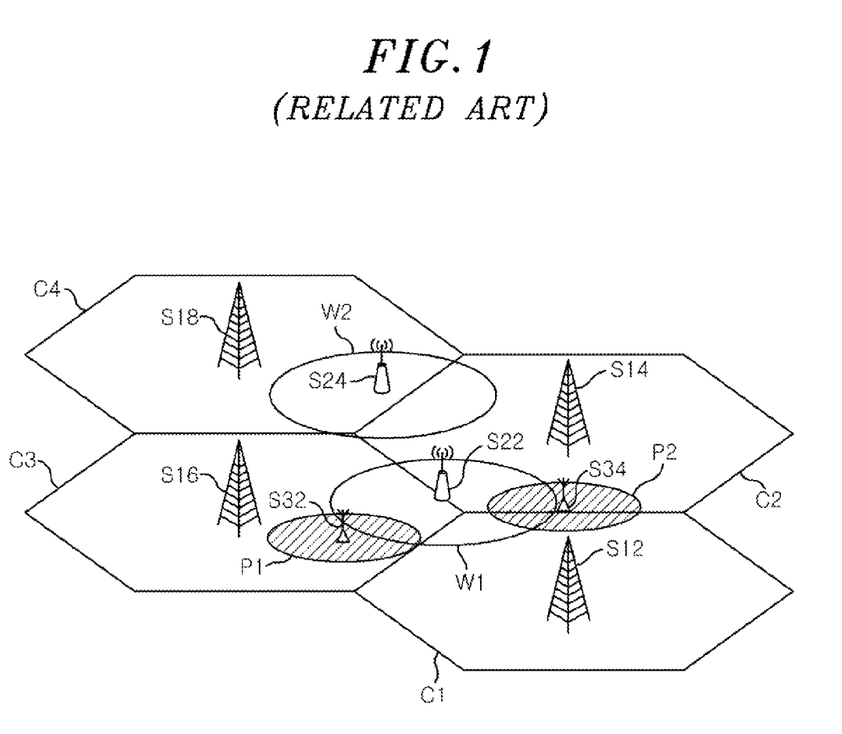
FIG. 1 is a view illustrating the configuration of a radio communication network in the related art.

FIG. 1 illustrates the configuration of a radio communication network. Four base stations S12, S14, S16, and S18 provide communication to users within their coverages (i.e., cells) C1, C2, C3, and C4, respectively. For example, communication by the base stations S12, S14, S16, and S18 may be 2G, 3G, or 4G communication based on time division multiple access (TDMA), code division multiple access (CDMA), frequency division multiple access (FDMA), or orthogonal frequency division multiple access (OFDMA). For example, 2G communication includes CDMA and global system for mobile communications (GSM), 3G communication includes wideband CMDA (WCDMA), and 4G communication includes long term evolution (LTE), LTE-Advanced, and WiBro (Wireless Broadband).

Meanwhile, access points (APs) S22 and S24 may be access points for WLAN including IEEE 802.11a, 11b, 11g, 11n, 11h, 11ac, and 11ad that provides radio communication to users within coverages W1 and W2 thereof.

Communication provided by the APs S22 and S24 may be packet data communication using TCP/IP. In addition, APs S32 and S34 may be wireless personal area network (WPAN) which provides radio communication to users within coverages P1 and P2 thereof. Communication provided by the APs S32 and S34 may be ultra-short range radio communication including Bluetooth™, ZigBee™ (IEEE 802.15.4 ZigBee), or the like and may be packet data communication using TCP/IP. The base stations (BSs) S12, S14, S16, and S18, and WLAN/WPAN APs S22, S24, 32, and 34 expressed by radio APs S12, S14, S16, S18, S22, S24, S32, and S34 may exist in mutually adjacent locations in overlapping coverage.

The number of user terminals existing within the coverage continues to be changed depending on user movement, and each radio AP appropriately controls the use of communication resources thereof in response to the change. However, although resource management within single coverage is performed by a radio AP, a resource management over the entire network is not performed. For example, when multiple users within a coverage C1 of the BS S12 move to a coverage C2 of the adjacent radio AP S14, the radio AP S14 senses the new users and increases usage channels, or the like, to provide service to the new users, while the radio AP S12 reduces usage channels. In this manner, services may be continuously provided to the users, but this method has some limitations as follows.

First, the BS S12 does not use some of channels allocated thereto or a portion of available hardware, while the processing capacity of the BS S14 is surpassed so the BS S14 cannot serve all the users. For example, it is assumed that the BS S12 and the BS S14 retain channel cards available to serve 64 terminals, respectively, and 64 users are present in the cells C1 and C2, respectively. In this case, when some users move from the cell C1 to the cell C2, the BS S12 is in a situation in which it does not use the whole of the capacity of the channel cards thereof, while the BS S14 cannot provide a service to all the users. Thus, although the capacities of the channel cards retained by the two BSs S12 and S14 are enough to serve all the users, since the users are distributed, they cannot be served.

Further, substantially, there is no management mechanism between the BSs S12, S14, S16, and S18, and the APs S22, S24, S32, and S34. Thus, in a region in which a coverage W1 of the AP 22 and a coverage C2 of the BS S14 overlap, the BS S14 and the AP S22 independently perform communication, resulting inevitably in an ineffective use of communication resources. This is the same with the other APs S22, S24, S32, and S34.

In accordance with the present invention, the integrated BS capable of optimally managing resources between several homogenous or heterogeneous simplified radio APs and a network using the same are provided. When the provided network is used, efficiency of utilizing resources between simplified radio APs can be enhanced, so performance can be improved and energy/resource can be saved. In addition, since the existing radio APs such as a BS and a short-range or ultra-short range radio AP are replaced by the more simplified radio APs (simplified radio BS and short-range simplified radio AP), installation costs of a new network and maintenance costs can be reduced. Also, since handover is performed between radio APs in a simpler manner, communication efficiency can be enhanced, and communication performance can be improved by allowing several simplified radio APs to serve a single terminal as necessary. Besides, the accuracy in determining a location of a terminal can be enhanced by using signals from several simplified radio APs.

SUMMARY OF THE INVENTION

In view of the above, the present invention provides an integrated base station capable of optimally managing resources in an environment in which several homogeneous or heterogeneous networks coexist and minimizing waste energy, a simplified radio access point connected to the integrated base station, and a network using the same.

In accordance with a first aspect of the present invention, there is provided an integrated base station (BS) communicatively combined with two or more simplified radio access points (APs). The integrated BS is configured to receive a signal from a backbone/backhaul network and transmits the received signal to the simplified radio APs, route a signal to at least one of the two or more simplified radio APs, and communicate with the two or more simplified radio APs through wire communication.

The simplified radio APs may include radio BSs that support user terminals using at least one cellular communication of code division multiple access (CDMA), global system for mobile communications (GSM), wideband CMDA (WCDMA), long term evolution (LTE), LTE-Advanced, and WiBro.

The simplified radio APs may include radio APs that support user terminals using at least one near field communication of IEEE 802.11a, 11b, 11g, 11n, 11h, 11ac, and 11ad.

Further, the simplified radio APs may be radio APs that support user terminals using at least one near field communication of IEEE 802.15.1 (Bluetooth) and 802.15.4 (ZigBee).

The wireline communication may be optical communication.

Further, the wireline communication may be used for a single-hop or multi-hop communication through a different simplified radio AP that performs wireline communication with the integrated BS.

The integrated BS may include two or more signal processing paths which correspond to the two or more simplified radio APs, respectively, and processes a baseband signal to the simplified radio APs corresponding to a signal from the backbone/backhaul network, the signal processing paths being activated or deactivated based on a communication situation of the simplified radio APs.

Further, the wireline communication may be used for radio on fiber (RoF) communication, the signal processing paths may include a baseband processing unit configured to convert a signal from the backbone/backhaul network into a symbol, a radio conversion unit configured to convert the symbol into a radio signal, and an optical conversion unit configured to convert the radio signal into an optical signal, and the integrated BS may further include a management unit configured to activate or deactivate the baseband processing unit, and the activation or deactivation of the signal processing paths is achieved by activation or deactivation of the baseband processing unit.

Further, the wireline communication may be used for remote radio head, the signal processing paths may include a baseband processing unit configured to convert a signal from the backbone/backhaul network into a symbol, and a radio conversion unit configured to convert the symbol into a radio signal, and the activation or deactivation of the signal processing paths may be achieved by activation or deactivation of the baseband processing unit.

The integrated BS may further comprise two or more signal processing paths configured to convert a signal from the backbone/backhaul network into a corresponding wired signal toward the simplified radio APs, and correspond to the two or more simplified radio APs respectively; and a handover management unit configured to change the signal processing paths for a signal to be transmitted to a user depending on a user movement.

Further, the handover management unit may change a signal processing path among signal processing paths corresponding to the same types of simplified radio APs.

The integrated BS may further comprise a baseband processing unit configured to convert a signal from the backbone/backhaul network into a symbol; an optical conversion unit configured to convert the symbol from the baseband processing unit into a wired signal; and a path management unit configured to selectively activate or deactivate communication between the baseband processing unit and the optical conversion unit. The handover management unit may control the path management unit to change the signal processing path for the signal to be transmitted.

Further, the handover management unit may change a signal processing path among signal processing paths corresponding to different types of simplified radio APs.

The simplified radio APs may include a first point which is a simplified radio BS for cellular communication, and a second point which is a simplified wireless local area network AP for wireless local area network communication. The integrated BS may further comprise a first baseband processing unit configured to convert a signal from the backbone/backhaul network into a symbol for transmission to the first point; a second baseband processing unit configured to convert a signal from the backbone/backhaul network into a symbol for transmission to the second point; and a connection unit configured to allow the signal from the backbone/backhaul network to be transferred to one of the first baseband processing unit and the second baseband processing unit. The handover management unit may control the connection unit to change the signal processing path for the signal to be transmitted.

Further, the integrated BS may further comprise a resource management unit configured to determine at least one of a frequency to be used for a signal transmission to each of the simplified radio APs, a time for signal transmission to each of the simplified radio APs, a data rate to be used for a signal transmission to each of the simplified radio APs based on a communication state of each of the simplified radio APs.

Furthermore, the integrated BS may transmit or receive a position determination signal to a user terminal through the two or more simplified APs.

In accordance with a second aspect of the present invention, there is provided a network system including the integrated BS described above; and two or more simplified radio APs connected to perform wireline communication with the integrated BS.

In accordance with the present invention, the integrated BS capable of optimally managing resources between several homogenous or heterogeneous simplified radio APs and a network using the same are provided. When the provided network is used, efficiency of utilizing resources between simplified radio APs can be enhanced, so performance may be improved and energy/resource may be saved. In addition, since the existing radio APs such as a BS and a short-range or ultra-short range radio AP are replaced by the more simplified radio APs (simplified radio BS and short-range simplified radio AP), installation costs of a new network and maintenance costs can be reduced. Further, since handover is performed between radio APs in a simpler manner, communication efficiency may be enhanced, and communication performance may be improved by allowing several simplified radio APs to serve a single terminal as necessary. Besides, the accuracy in determining the location of a terminal may be enhanced by using signals from several simplified radio APs.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, specific embodiments of the present invention will be described in detail with the accompanying drawings which form a part hereof. Accompanying drawings are based on inaccurate scales and dimensions for the convenience of explanation.

Figure 2:
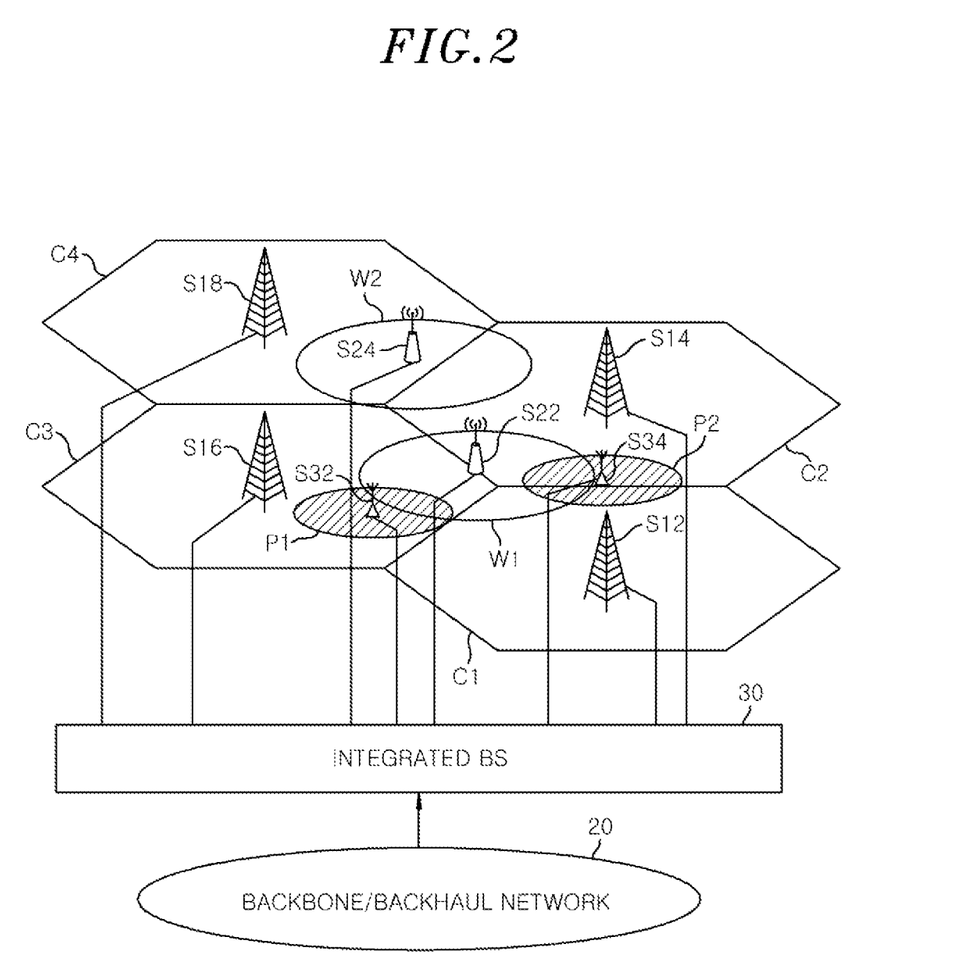
FIG. 2 is a view illustrating the configuration of a radio communication network in accordance with an embodiment of the present invention.

FIG. 2 is a view illustrating the configuration of a radio communication network in accordance with an embodiment of the present invention. The network in accordance with the present embodiment includes simplified radio access points (APs) S12, S14, S16, S18, S22, S24, S32, and S34, and an integrated base station 30 which communicates with the APs.

As used herein, the term "simplified radio AP" refers to a device that transfers a signal between a user terminal and an integrated base station (BS) 30. For example, a simplified radio AP includes a simplified RF BS including a radio transmission and reception unit, an RF unit, a signal processing path for performing conversion between a radio signal and a wired signal such as optical signal or the like corresponding thereto, and an antenna in cellular communication, a radio AP including a radio transmission and reception unit, an RF processing unit, a signal processing path for performing conversion between a radio signal and a wired signal such as optical signal or the like corresponding thereto, and an antenna in WLAN, and a simplified radio AP (or a piconet coordinator) including a radio transmission and reception unit, an RF processing unit, and a signal processing path for performing conversion between a radio signal and a wired signal such as optical signal or the like corresponding thereto, and an antenna in WPAN, and their equivalents. Further, as used herein, the term "transferring" signal includes processing a signal based on a communication scheme used by both entities and then transmitting the same, as well as simply receiving a signal from an entity and transmitting the same signal to a different entity.

In the wireless network shown in FIG. 2, the simplified radio APs S12, S14, S16, and S18 are simplified radio BSs for cellular communication, simplified radio APs S22 and S24 are simplified radio APs for local area networks, and simplified radio APs S32 and S34 are simplified radio APs for ultra-short range radio communication. The simplified radio BSs S12, S14, S16, and S18 cover cells C1, C2, C3, and C4 to provide communication to users within the cells, respectively, and the simplified radio APs S22, S24, S32, and S34 provide a service to users within the coverages W1, W2, P1, and P2, respectively.

The simplified radio BSs S12, S14, S16, and S18 and the simplified radio APs S22, S24, S32, and S34 communicate with the integrated BS 30. The integrated BS 30 is also connected to a backbone/backhaul network 20 to perform signal transmission between the simplified radio BSs S12, S14, S16 and S18 and the simplified radio APs S22, S24, S32 and S34 and the backbone/backhaul network 20.

In one embodiment, communication between the integrated BS 30 and a simplified radio AP may be optical communication, and the simplified radio BSs S12, S14, S16 and S18 and the simplified radio APs S22, S24, S32 and S34 may be connected with the integrated BS 30 by an optical cable. Specifically, the integrated BS 30 may be connected to the simplified radio BSs S12, S14, S16 and S18 and the simplified radio APs S22, S24, S32 and S34 through an radio-over-fiber (RoF) technique. The RoF technique is a technique for modulating a radio signal into an optical signal and transmitting the modulated radio signal through an optical cable. Since the RoF technique has little communication loss and supports even high speed communication by gigabits, it is very advantageous. The use of the RoF technique ensures highly reliable and effective communication between the integrated BS 30 and the simplified radio AP, so communication efficiency is not degraded although the integrated BS 30 is added.

In addition, in one embodiment, communication between the integrated BS 30 and the simplified radio AP may be a wired/wireless multi-hop communication through a relay (or relays). The ultra-short range simplified radio APs S32 and S34 may be connected with the integrated BS 30 by wired/wireless multi-hope communication. Specifically, the integrated BS 30 may be connected to the simplified radio BSs S12, S14, S16, and S18 and the simplified radio APs S22, S24, and S32 through the RoF technique, and one ultra-short range simplified radio AP S34 may be connected to the integrated BS 30 through wired/wireless multi-hope communication using the adjacent simplified radio BSs S12, S14, S16, and S18 and/or the simplified radio APs S22, S24, and S32 as relay nodes.

The integrated BS 30 includes a unit for processing signals to/from the simplified radio BSs S12, S14, S16, and S18 and the simplified radio APs S22, S24, S32, and S34 to allow communication resources to be effectively distributed and used between the simplified radio BSs and the simplified radio APs. This will be described in detail with reference to FIG. 3.

Figure 3:
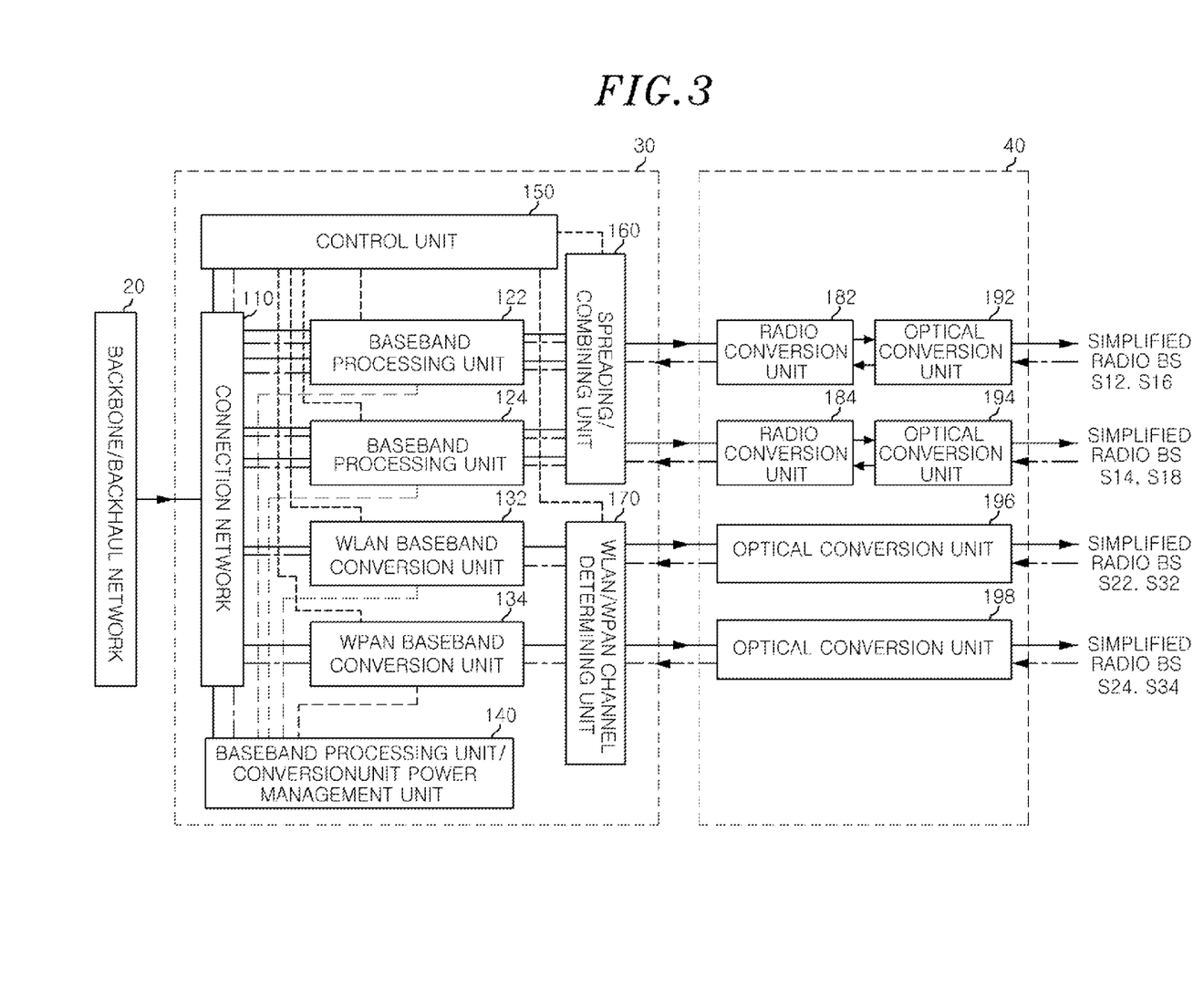
FIG. 3 is a block diagram showing the configuration of an integrated base station in accordance with an embodiment of the present invention.

FIG. 3 is a block diagram showing the configuration of an integrated BS in accordance with an embodiment of the present invention. The integrated BS in accordance with the present embodiment is illustrated to be connected to two simplified radio BSs S12 and S14 and two simplified radio APs S22 and S24, but this is merely illustrative and a different number of a 2G, 3G, or 4G simplified radio BSs and/or various simplified radio APs such as WLAN, Bluetooth™, ZigBee™ and the like, available for various types of cellular communication may be connected. Meanwhile, the integrated BS is connected to a backbone/backhaul network 20 to communicate with the backbone/backhaul network. Further, it is illustrated that wireline communication such as optical communication or the like connected to each radio AP and the integrated BS uses the RoF technique, but this is merely illustrative and the wireline communication such as optical communication or the like may be connected by using various wireline communication techniques such as an optical communication technique or the like. Thus, the integrated BS in accordance with the present embodiment includes four signal paths connected to respective simplified radio BSs and simplified radio APs, in which each signal path may be activated or deactivated as necessary.

The integrated BS 30 in accordance with the present embodiment includes a connection network 110 for receiving a signal from the backbone/backhaul network 20, baseband processing units 122 and 124 for receiving a signal for cellular communication from the connection network 110 and converting it into a symbol, WLAN baseband conversion units 132 and WPAN baseband conversion unit 134 for converting the converted symbol into a radio signal, and a baseband processing unit/conversion unit power management unit 140 for managing power of the baseband processing unit and the WLAN baseband conversion unit. Also, the integrated BS 30 includes a cellular spreading/combining unit 160 for distributing signals exchanged between the baseband processing units 122 and 124 for cellular communication and a different simplified radio BS, and a WLAN/WPAN channel determining unit 170 for determining usage channels of different simplified radio APs.

Meanwhile, in one embodiment, a signal from the integrated BS 30 is delivered to the optical conversion unit 40 so as to be converted into an optical signal and subsequently transferred to a simplified radio BS and/or a simplified radio AP. Specifically, the optical conversion unit 40 may include radio conversion units 182 and 184 for converting a signal for cellular communication from the cellular spreading/combining unit into a signal for radio communication, and optical conversion units 192 and 194 for converting a signal from the radio conversion units 182 and 184 into an optical signal. In addition, optical conversion units 196 and 198 for converting a signal toward a simplified radio AP into an optical signal may also be included in the optical conversion unit 40. The thusly converted wired signals such as optical signal or the like from the optical conversion units 192, 194, 196, and 198 are transmitted to the simplified radio BSs S12, S14, S16 and s18 and the simplified radio APs S22, S24, S32, and S34, respectively.

In the embodiment of FIG. 3, the optical conversion unit 40 is employed, but the present invention is not limited to conversion of a signal into an optical signal, and a person skilled in the art will appreciate that the present invention may include converting a signal into a different type of wired signal and transmitting the same to a simplified radio AP. Further, in FIG. 3, it is illustrated that the optical conversion unit 40 is a separate component apart from the integrated BS 30, but this is merely for the convenience of explanation and it will be obvious to a person skilled in the art that the optical conversion unit 40 may be configured to be integrated into the integrated BS 30.

The connection network 110 may serve as a connection unit for connecting the backbone/backhaul network 20 and the integrated BS 30. Also, the connection network 110 may serve as a path management unit for initially controlling a path along which a signal from the backbone/backhaul network 20 is to be transferred.

Hereinafter, communication from the backbone/backhaul network 20 to a simplified radio AP is described, but a person skilled in the art will understand that communication from a simplified radio AP to the backbone/backhaul network 20 is applied in a reverse direction in the following description. When the integrated BS 30 receives a signal from the backbone/backhaul network 20, it transmits, that is, routes the received signal to one of a signal path to the simplified radio BSs S12, S14, S16 and S18 and a signal path to the simplified radio APs S22, S24, S32, and S34.

In one embodiment, a control unit 150 may control the connection network 110 for receiving a signal from the backbone/backhaul network 20 and transfers it along an appropriate path. In one embodiment, the control unit 150 may serve as a resource management unit that determines at least one of frequencies to be used for a signal transmission to each simplified radio AP, a time for signal transmission to each simplified radio AP, a data rate to be used for a signal transmission to each simplified radio AP, and transmission power in the simplified radio AP based on a communication state of each radio AP and a channel state. Further, in one embodiment, the control unit 150 may serve as a handover management unit.

The control unit 150 may receive information regarding a communication state of each radio AP and a channel state through feedback, and perform resource management and/or handover management based thereon. The feedback path is indicated by the alternate long and short dash line in the drawing.

In one embodiment, the control unit 150 recognizes a type of a signal by detecting a field or a flag included in data transferred by the signal, and transfers the signal to an appropriate path. In another embodiment, the control unit 150 may detect a wavelength of a signal or a channel, and determine an appropriate path accordingly. For example, in case of a signal using a channel to the simplified radio BS S12, the control unit 150 may generate a signal path to the corresponding simplified radio BS and transfer the signal thereto.

When a signal for cellular communication to be transferred to a simplified radio BS is received from the backbone/backhaul network 20, the control unit 150 controls the connection network 110 and transfers the signal to the baseband processing units 122 and 124. In one embodiment, the baseband processing unit may be a single unit for managing channels to be allocated to different users. The baseband processing units 122 and 124 convert a signal into a symbol and transfer the symbol to the spreading/combining unit 160. Further, the spreading/combining unit 160 transfers the symbol to the radio conversion units 182 and 184, and the radio conversion units 182 and 184 convert the symbol into a radio signal. The converted radio signal is converted into an optical signal back by the optical conversion units 192 and 194 and transferred to a simplified radio BS through, for example, RoF communication.

Here, the baseband processing units 122 and 124 are connected to the baseband processing unit/conversion unit power management unit 140 and controlled. The baseband processing unit/conversion unit power management unit 140 determines by which of baseband processing units 122 and 124, e.g., a channel unit, a signal is to be processed, and deactivates a channel unit not required for processing a corresponding signal. Also, when multiple signals are input so multiple channel units are required to be operated, the baseband processing unit/conversion unit power management unit 140 activates an additional channel unit to process the signals. Thus, resources over several BSs can be managed, and power can be effectively used. In one embodiment, the baseband processing unit/conversion unit power management unit 140 may manage activation and deactivation of the baseband processing units 122 and 124 based on a feedback signal as indicated by the alternate long and short dash line in FIG. 3.

In addition, communication between the baseband processing units 122 and 124 and the radio conversion units 182 and 184 is performed by the medium of the spreading/combining unit 160. The spreading/combining unit 160 may control routing of a signal and allow for handover under the control of the control unit 150. For example, when two users are served by the simplified radio BS S12, all of the signals by the two baseband processing units 122 and 124 may be transferred to the simplified radio BS S12 by the spreading/combining unit 160. At this time, when one of the two users moves to the coverage C2 of the simplified radio BS S14, the spreading/combining unit 160 transfers the signal from the corresponding baseband processing unit to the radio conversion units 182 and 184 and the subsequent optical conversion units 192 and 194 using optical signal or the like. In this manner, in accordance with the present embodiment, handover may be easily performed by simply changing the signal path in the integrated BS without the necessity of a complicated process such as channel reallocation.

Further, when signals to the simplified radio APs S22, S24, S32, and S34 are received from the backbone/backhaul network 20, the signals are transferred to the WLAN baseband conversion unit 132 and WPAN baseband conversion unit 134 through the connection network 110 under the control of the control unit 150, and radio signals converted by the WLAN baseband conversion unit 132 and WPAN baseband conversion unit 134 are converted into optical signals back by the optical conversion units 196 and 198 and transmitted to an AP.

Here, the WLAN baseband conversion unit 132 and the WPAN baseband conversion unit 134 are also connected to the baseband processing unit/conversion unit power management unit 140 to be activated or deactivated. That is, when a user exists only in any one of the coverages of the simplified radio BSs S12 and S14, the WLAN baseband conversion unit 132 and the WPAN baseband conversion unit 134 in a signal path to a BS in which a user does not exist are deactivated to thus enhance efficiency of resource and power usage. In one embodiment, the baseband processing unit/conversion unit power management unit 140 activates or deactivates the WLAN baseband conversion unit 132 and the WPAN baseband conversion unit 134 based on a feedback signal.

In another embodiment, the integrated BS may provide handover between heterogeneous networks. For example, a case in which a user moves from the coverage C2 of the simplified radio BS S14 to the coverage W1 of the simplified radio AP S22 is considered. Initially, the control unit 150 controls the connection network 110 to transfer a signal from the backbone/backhaul network 20 to the baseband processing unit 122 and a symbol from the baseband processing unit 122 to the BS S14 through the radio conversion unit 182 and the optical conversion unit 192 through the spreading/combining unit 160. In this process, the spreading/combining unit 160 is controlled by the control unit 150 and the signal is transferred to the radio conversion unit 182. Meanwhile, when the user moves from the coverage C4 to the coverage W1, the control unit 150 controls the connection network 110 to transfer a signal to the WLAN baseband conversion unit 132. Accordingly, the signal is transferred to the simplified radio AP S22 by the signal path including the WLAN baseband conversion unit 132 and the optical conversion unit 196 so as to be transferred to the user. In this manner, the integrated BS in accordance with the present embodiment allows for handover between heterogeneous networks by simply changing a signal path without performing a complicated process such as a channel allocation.

The handover between heterogeneous networks may be combined with a power management by a management unit. For example, while a user is being served by the simplified radio BS S14, the WLAN baseband conversion unit 132 and the WPAN baseband conversion unit 134 are all deactivated by the baseband processing unit/conversion unit power management unit 140, while a user is being served by the simplified radio AP S22, the baseband processing units 122 and 124 may be all deactivated by the baseband processing unit/conversion unit power management unit 140. Thus, power efficiency in the handover process between heterogeneous networks can be enhanced.

In another embodiment, the integrated BS 30 may perform signal exchange with a simplified radio AP by using a remote radio head technique. For example, when a remote radio head using an open base station architecture (OPSAI) and a common public radio interface (CPRI) standard is intended to be supported, the integrated BS may include only the radio conversion units 182 and 184 in a remote radio head simplified radio BS shown in FIG. 3, and the optical conversion units 192, 194, 196, and 198 change a radio signal into a wired signal such as optical signal or the like, based on the CPRI to thus perfectly support the remote radio head desired to be used for cellular radio communication.

In one embodiment, the integrated BS 30 may enhance accuracy of a location-based service. In one embodiment, the integrated BS may provide a position determination signal to a user terminal through two or more simplified radio BS and/or simplified radio APs. The user terminal may determine its location by using the two or more position determination signals so transmitted, or alternatively, the integrated BS may determine a location of the user based on a signal transmitted by the user terminal in response to the position determination signal. Since two or more simplified radio BSs and/or simplified radio APs are managed by a single device and transmit a position determination signal, the user terminal may be able to use more information to determine its location, and thus, the accuracy of position determination can be enhanced. Thus, the quality of the location-based service (LBS) can be enhanced by using the integrated BS.

The integrated BS 30 may be combined with radio APs by various network topologies, and an example thereof will be described with reference to FIGS. 4A to 4D.

Figure 4A:
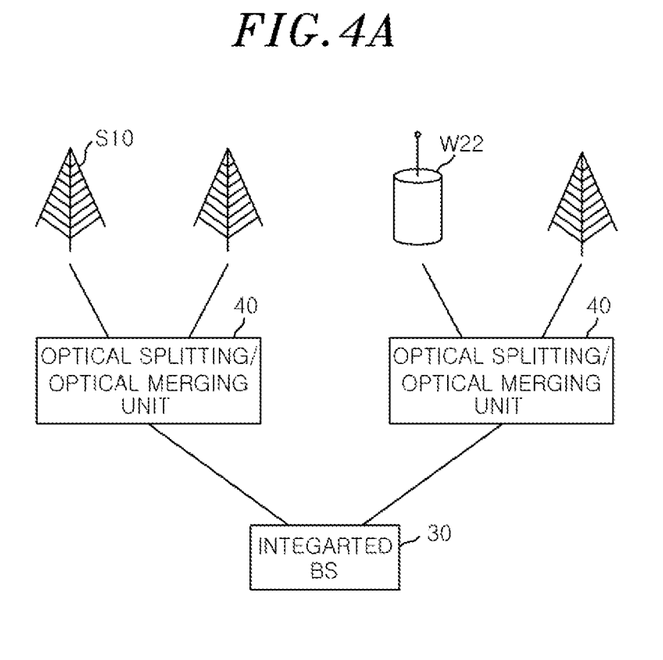
FIGS. 4A to 4D illustrate examples of network topologies including an integrated base station in accordance with an embodiment of the present invention.

FIG. 4A illustrates an embodiment in which the integrated BS 30 is included in a star topology. A signal from the integrated BS 30 is divided by the optical splitting/optical merging unit 40 and transmitted to the simplified radio BS S10 or the simplified radio AP W22. In this topology, a network can be easily extended by adding the optical splitting/optical merging unit 40. However, when a bottleneck phenomenon occurs in the optical splitting/optical merging unit 40, or when there is a problem with communication between the optical splitting/optical merging unit 40 and the integrated BS 30, a communication fault may occur and radio APs cannot perform direct communication.

Figure 4B:
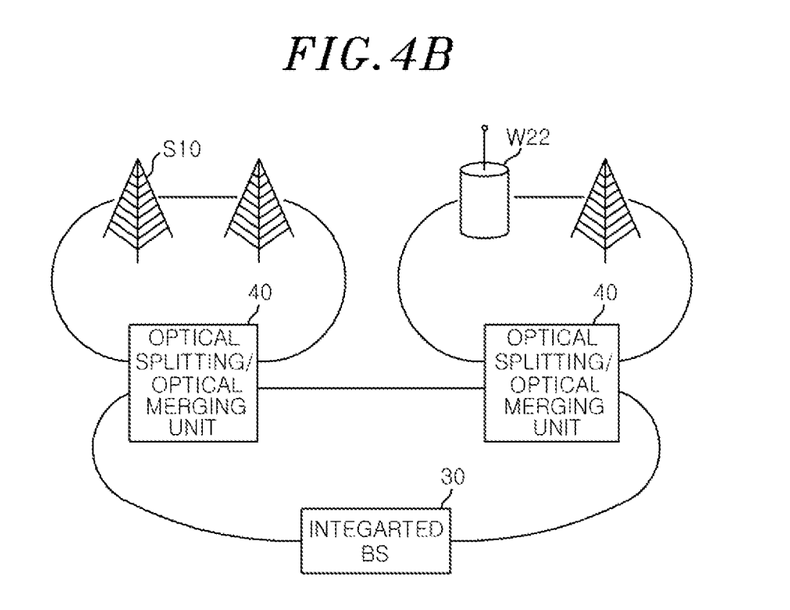

FIG. 4B illustrates an embodiment in which the integrated BS 30 is included in a ring topology. In this topology, each simplified radio APs may directly communicate with each other and an occurrence of a bottleneck phenomenon can be reduced. However, since it is difficult to add a new simplified radio AP, this topology has low network expandability.

Figure 4C:
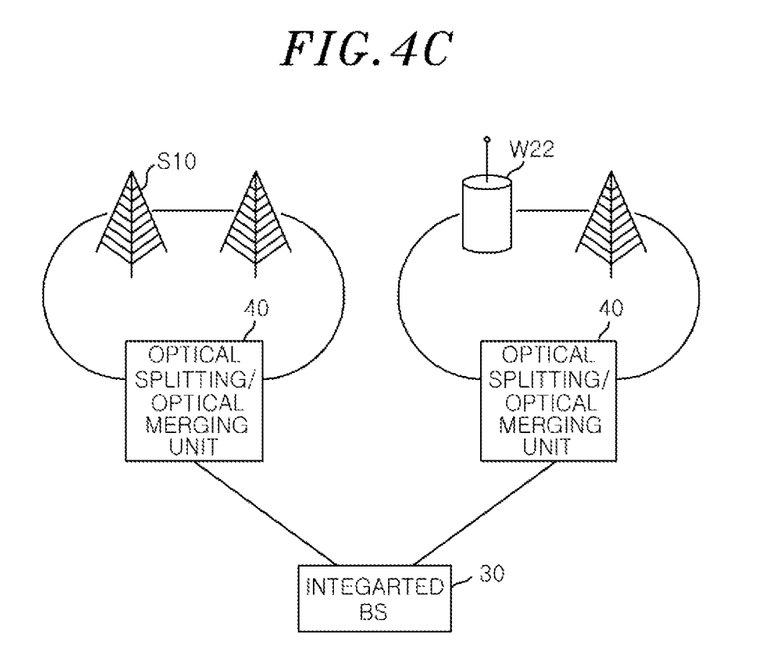

FIG. 4C illustrates a star-ring topology. In this topology, communication to the optical splitting/optical merging unit 40 employs the star topology, while communication from the optical splitting/optical merging unit 40 employs the ring topology. Thus, a network can be expanded by adding an optical splitting/optical merging unit, and adjacent simplified radio APs can directly communicate with each other. However, the possibility of occurrence of a bottleneck phenomenon in the optical splitting/optical merging unit 40 and a possibility of a communication fault due to a link failure between the optical splitting/optical merging unit 40 and the integrated BS 30 still remain.

Figure 4D:
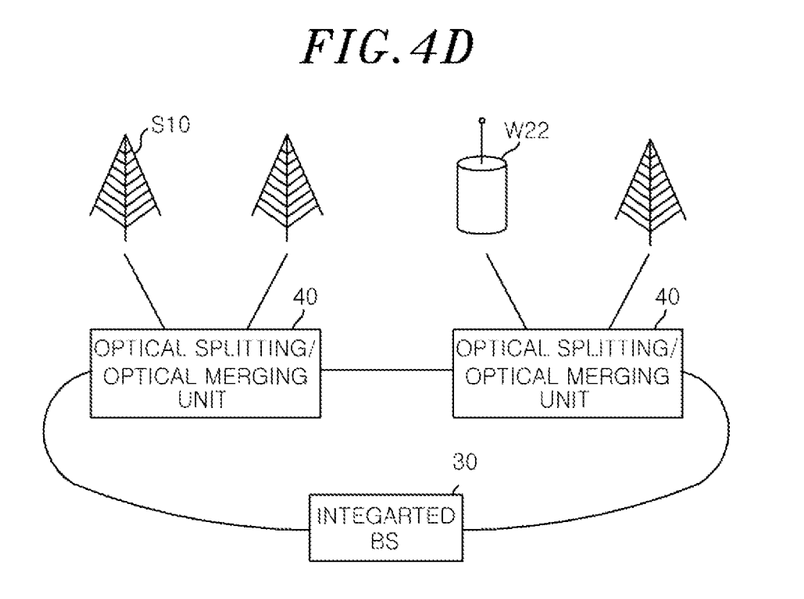

FIG. 4D illustrates a ring-star topology. In this topology, the optical splitting/optical merging unit 40 and the integrated BS are connected by a ring topology, and a connection from the optical splitting/optical merging unit to the radio BS S10 or the simplified radio AP W22 follows the star topology. Thus, network expandability can be increased and the possibility of a communication fault due to a link failure can be lowered, but simplified radio APs cannot directly communicate with each other.

A skilled person in the art may configure a network by appropriately using the illustrated topologies.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An integrated base station (BS) communicatively combined with two or more simplified radio access points (APs), wherein the integrated BS is configured to:
receive a signal from a backbone/backhaul network and transmit the received signal to the simplified radio APs;
route a signal to at least one of the two or more simplified radio APs; and
communicate with the two or more simplified radio APs through wireline communication, wherein the simplified radio APs include a first point which is a simplified radio BS for cellular communication, and a second point which is a simplified wireless local area network AP for wireless local area network communication;
a first baseband processing unit configured to convert a signal from the backbone/backhaul network into a symbol for transmission to the first point;
a second baseband processing unit configured to convert a signal from the backbone/backhaul network into a symbol for transmission to the second point; and
a connection unit configured to allow the signal from the backbone/backhaul network to be transferred to one of the first baseband processing unit and the second baseband processing unit, and
wherein the handover management unit controls the connection unit to change a signal processing path for the signal to be transmitted.

2. The integrated BS of claim 1, wherein the simplified radio APs include radio BSs that support user terminals using at least one cellular communication of code division multiple access (CDMA), global system for mobile communications (GSM), wideband CMDA (WCDMA), long term evolution (LTE), LTE-Advanced, and WiBro.

3. The integrated BS of claim 1, wherein the simplified radio APs include radio APs that support user terminals using at least one local area network of IEEE 802.11a, 11b, 11g, 11n, 11h, 11ac, and 11ad.

4. The integrated BS of claim 1, wherein the simplified radio APs are radio APs that support user terminals using at least one near field communication of IEEE 802.15.1 (Bluetooth) and 802.15.4 (ZigBee).

5. The integrated BS of claim 1, wherein the wireline communication is optical communication.

6. The integrated BS of claim 1, wherein the wireline communication is used for a single-hop or multi-hop communication through a different simplified radio AP that performs wireline communication with the integrated BS.

7. The integrated BS of claim 1, wherein the integrated BS includes two or more signal processing paths which correspond to the two or more simplified radio APs, respectively, and process a baseband signal to the simplified radio APs corresponding to a signal from the backbone/backhaul network,
the signal processing paths being activated or deactivated based on a communication situation of the simplified radio APs.

8. The integrated BS of claim 7, wherein the wireline communication is used for radio on fiber (RoF) communication,
the signal processing paths include a baseband processing unit configured to convert a signal from the backbone/backhaul network into a symbol, a radio conversion unit configured to convert the symbol into a radio signal, and an optical conversion unit configured to convert the radio signal into an optical signal,
the integrated BS further includes a management unit configured to activate or deactivate the baseband processing unit, and
the activation or deactivation of the signal processing paths is achieved by activation or deactivation of the baseband processing unit.

9. The integrated BS of claim 7, wherein the wireline communication is used for remote radio head,
the signal processing paths include a baseband processing unit configured to convert a signal from the backbone/backhaul network into a symbol, and a radio conversion unit configured to convert the symbol into a radio signal, and
the activation or deactivation of the signal processing paths is achieved by activation or deactivation of the baseband processing unit.

10. The integrated BS of claim 1, further comprising:
two or more signal processing paths configured to convert a signal from the backbone/backhaul network into a corresponding wired signal toward the simplified radio APs, and correspond to the two or more simplified radio APs respectively; and
a handover management unit configured to change the signal processing paths for a signal to be transmitted to a user depending on a user movement.

11. The integrated BS of claim 10, wherein the handover management unit changes a signal processing path among signal processing paths corresponding to the same types of simplified radio APs.

12. The integrated BS of claim 11, further comprising:
a baseband processing unit configured to convert a signal from the backbone/backhaul network into a symbol;
an optical conversion unit configured to convert the symbol from the baseband processing unit into a wired optical signal; and
a path management unit for selectively activating or deactivating communication between the baseband processing unit and the optical conversion unit,
wherein the handover management unit controls the path management unit to change the signal processing path for the signal to be transmitted.

13. The integrated BS of claim 10, wherein the handover management unit changes a signal processing path among signal processing paths corresponding to different types of simplified radio APs.

14. The integrated BS of claim 1, further comprising:
a resource management unit configured to determine at least one of frequencies to be used for a signal transmission to each of the simplified radio APs, a time for signal transmission to each of the simplified radio APs, a data rate to be used for a signal transmission to each of the simplified radio APs based on a communication state of each of the simplified radio APs.

15. The integrated BS of claim 1, wherein the integrated BS transmits or receives a position determination signal to a user terminal through the two or more simplified APs.

16. A network system comprising: an integrated base station (BS); and two or more simplified radio access points (APs) connected to perform wireline communication with the integrated BS, wherein the integrated BS is configured to:
receive a signal from a backbone/backhaul network and transmit the received signal to the simplified radio APs;
route a signal to at least one of the two or more simplified radio APs; and communicate with the two or more simplified radio APs through wireline communication, wherein the simplified radio APs include a first point which is a simplified radio BS for cellular communication, and a second point which is a simplified wireless local area network AP for wireless local area network communication;

a first baseband processing unit configured to convert a signal from the backbone/backhaul network into a symbol for transmission to the first point;

a second baseband processing unit configured to convert a signal from the backbone/backhaul network into a symbol for transmission to the second point; and a connection unit configured to allow the signal from the backbone/backhaul network to be transferred to one of the first baseband processing unit and the second baseband processing unit, and wherein the handover management unit controls the connection unit to change a signal processing path for the signal to be transmitted.

* * * * *